(12) United States Patent
Bud et al.

(10) Patent No.: US 9,412,169 B2
(45) Date of Patent: Aug. 9, 2016

(54) REAL-TIME VISUAL FEEDBACK FOR USER POSITIONING WITH RESPECT TO A CAMERA AND A DISPLAY

(71) Applicant: iProov, London (GB)

(72) Inventors: Andrew Bud, London (GB); Andrew Newell, London (GB); Joe Palmer, London (GB)

( * ) Notice: Subject to any disclaimer, the term of this patent is extended or adjusted under 35 U.S.C. 154(b) by 0 days.

(21) Appl. No.: 14/839,198

(22) Filed: Aug. 28, 2015

(65) Prior Publication Data

US 2016/0148384 A1 May 26, 2016

Related U.S. Application Data

(60) Provisional application No. 62/082,665, filed on Nov. 21, 2014.

(51) Int. Cl.
| | | |
|---|---|---|
| G06T 7/00 | (2006.01) | |
| G06K 9/00 | (2006.01) | |
| G06K 9/20 | (2006.01) | |
| G06T 11/60 | (2006.01) | |
| H04N 5/232 | (2006.01) | |

(52) U.S. Cl.
CPC .......... *G06T 7/0042* (2013.01); *G06K 9/00255* (2013.01); *G06K 9/00912* (2013.01); *G06K 9/2027* (2013.01); *G06T 11/60* (2013.01); *H04N 5/23229* (2013.01); *H04N 5/23293* (2013.01); *G06T 2207/10004* (2013.01); *G06T 2207/10016* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 4,975,969 A | 12/1990 | Tal | |
| 5,933,502 A | 8/1999 | Aucsmith et al. | |
| 8,326,001 B2 | 12/2012 | Free | |
| 8,548,207 B2 | 10/2013 | Langley et al. | |
| 9,075,975 B2 | 7/2015 | Bud | |
| 2007/0002157 A1* | 1/2007 | Shintani | H04N 5/23293 348/333.06 |
| 2011/0122294 A1 | 5/2011 | Suh et al. | |
| 2013/0015946 A1 | 1/2013 | Lau et al. | |
| 2013/0267204 A1 | 10/2013 | Schultz et al. | |
| 2015/0189138 A1* | 7/2015 | Xie | H04N 5/2256 348/222.1 |

OTHER PUBLICATIONS

Forbrig, et al., Interactive Systems, Design, Specification, and Verification, Jun. 2002.
Kim, et al., Image Obfuscation in the User-Friendly Sensitive Area with the Use of a Sensor for Smart Devices and Image Processing Techniques, International Journal of Distributed Sensor Networks vol. 2014, 2014.

(Continued)

*Primary Examiner* — Twyler Haskins
*Assistant Examiner* — Angel L Garces-Rivera

(57) ABSTRACT

Systems, methods, and computer program products provide near real-time feedback to a user of a camera-enabled device to guide the user to capture self-imagery when the user is in a desired position with respect the camera and/or the display of the device. The desired position optimizes aspects of self-imagery that is captured for applications in which the imagery is not primarily intended for the user's consumption. One class of such applications includes applications that rely on illuminating the user's face with light from the device's display screen. The feedback is abstracted to avoid biasing the user with aesthetic considerations. The abstracted imagery may include real-time cartoon-like line drawings of edges detected in imagery of the user's head or face.

25 Claims, 5 Drawing Sheets

(56) References Cited

OTHER PUBLICATIONS

Chatting, et al., Designing User Interaction for Face Tracking Applications.

FacialNetwork press release Jul. 8, 2015: ZoOm™, The World's First Secure Selfie 3D Authentication App, Announced by FacialNetwork.

Tanskanen, et al., Live Metric 3D Reconstruction on Mobile Phone, Dec. 2013.

Yu, et al., 3D Reconstruction from Accidental Motion, Jun. 2014.

Christian Nitschke et al., Display-Camera Calibration Using Eye Reflections and Geometry Constraints, Computer Vision and Image Understanding, Academic Press, US, vol. 115, No. 6, 2011, pp. 835-853.

Clemens Holtzmann et al., Measuring Distance with Mobile Phones Using Single-Camera Stereo Vision, 32nd IEEE International Conference on Distributed Computing systems Workshops, ICDSW 2012, IEEE, 2012, pp. 88-93, XP032217932.

5.2 Geometric Transformations Ed Sonka M; Hlavac V; Boyle R, 2008, Image Processing: Analysis and Machine Vision, London: Thomson Learning, GB, pp. 118-123, XP002729130.

\* cited by examiner

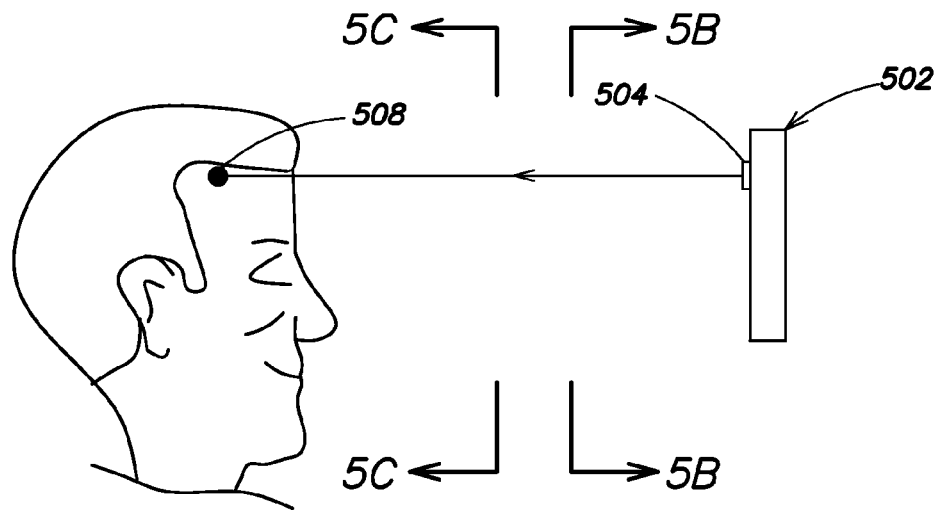
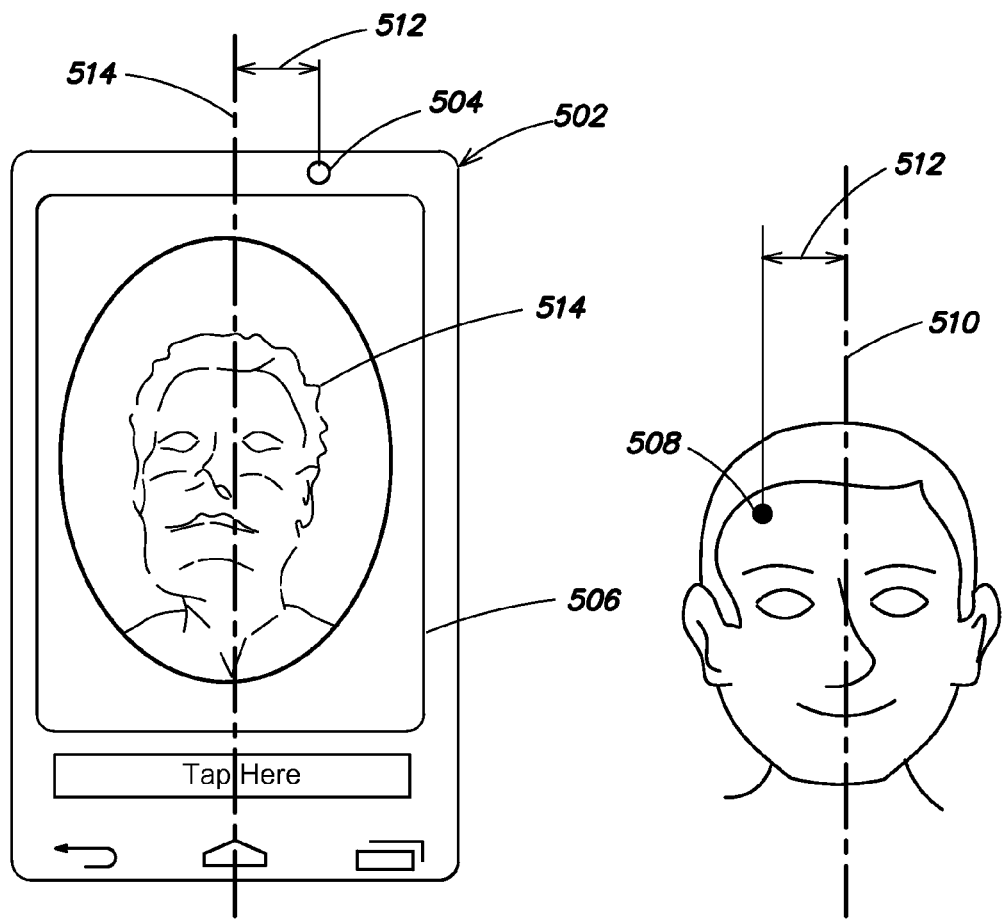
FIG. 5A
FIG. 5B
FIG. 5C

REAL-TIME VISUAL FEEDBACK FOR USER POSITIONING WITH RESPECT TO A CAMERA AND A DISPLAY

CROSS REFERENCE TO RELATED APPLICATION

This application claims right of priority to and the benefit under 35 U.S.C. §119(e) of U.S. Provisional Patent Application Ser. No. 62/082,665, filed Nov. 21, 2014, which is incorporated herein by reference.

BACKGROUND

An increasing proportion of electronic devices used both in consumer and work contexts incorporate cameras which face the user. Such devices include personal computers and laptops, tablets, smartphones, set-top boxes, point of sale systems and physical access control systems. In general, these cameras are intended for use with visual communication services—such as Skype video person-to-person calls—or to enable the user to take photographs and videos of themselves to capture a moment and perhaps to share. For these uses, it is highly desirable for users to be able to see their own image as it is being captured and/or transmitted. Reasons for doing so may include the ability to ensure that a person's facial presentation is attractive enough to share, or that the detail shown in the image is good enough for the purpose intended. In such cases, the user will normally be careful to position the camera at a distance and at an angle that will convey a good impression of their face and which is pleasing to their own eye.

There exists another class of uses for the front camera of a device where it is unimportant or even disruptive to let the user adjust the relative position of face and camera to achieve the most attractive visual result. In these uses the image or video of the user captured by the camera is normally not seen by the user, nor by anyone known to him. Here the important consideration may instead be that the face is close to the camera, or oriented at a particular angle or positioned in a particular position or positions relative to the camera. Sometimes the speed and nature of transaction does not allow for careful aesthetic optimization of the user's pose. There exists a need to provide rapid visual feedback to a user to enable suitable positioning of the face for this class of uses of the front camera of a device.

SUMMARY

Systems, methods, and computer program products described herein provide near real-time feedback to a user of a camera-enabled device to guide the user to capture self-imagery when the user is in a desired position and orientation with respect the camera and/or the display of the device. The desired position and orientation optimizes aspects of self-imagery that is captured when the imagery is not primarily intended for the user's consumption, instead serving a purpose of an application running on the mobile device and/or on a local or remote system in data communication with the device. The feedback is abstracted to avoid biasing the user with aesthetic considerations.

In general, in one aspect a method of capturing imagery of a user comprises capturing positioning imagery of the user with a camera; processing the positioning imagery substantially in real time to generate abstracted positioning imagery of the user; displaying the abstracted positioning imagery of the user on a display facing the user, wherein the abstracted positioning imagery provides visual feedback for guiding the user to move to a desired position with respect to the camera, without the abstracted positioning imagery also providing sufficient visual information for the user to assess a visual quality of the positioning imagery; and when the user is positioned in the desired position with respect to the camera, capturing application imagery of the user; and providing the captured application imagery of the user to an application without displaying the captured application imagery to the user.

Various embodiments include one or more of the following features. The abstracted positioning imagery provides visual feedback for guiding the user to move to a desired position with respect to the display, and wherein the application imagery of the user is captured when the user is positioned in the desired position with respect to the display. The display is capable of illuminating parts of the user that are closest to the display and included within a field of view of the camera when the user is in the desired position with respect to the camera. A normal to a centroid of the display intersects a head of the user at a point less than approximately two inches from a tip of a nose of the user when the user is in the desired position with respect to the camera. The user is located at a closest comfortable distance from the display when the user is in the desired position with respect to the camera. The camera is angled upwards towards the user when the user is in the desired position with respect to the camera. Displaying the abstracted imagery includes displacing imagery of the user to appear centered in the display when the user is off-center in the captured positioning imagery. Each of the captured imagery and the application imagery includes still images and/or video imagery. The display is used to illuminate the user during capture of the application imagery of the user. The camera and the display are connected to a local computer-based system having a network connection, and receiving at the local computer-based system data via the network connection for controlling the display, and during capture of the application imagery, using the local computer-based system to control the display using the data received at the computer-based system via the network connection. The received data cause the display to act as a source of controlled illumination of the user. The abstracted positioning imagery includes one or more of the following: lines representing substantial changes in brightness at small spatial scales in captured positioning imagery of the user; blurred imagery of the user; and circular features with colors based on colors of the captured positioning imagery. The user is alerted when the application imagery is captured. Assessing a visual quality of the positioning imagery includes assessing an aesthetic quality of the positioning imagery. After capturing application imagery of the user, displaying second abstracted positioning imagery of the user on the display facing the user, wherein the second abstracted positioning imagery provides visual feedback for guiding the user to move to a second desired position with respect to the camera; and when the user is positioned in the second desired position with respect to the camera, capturing second application imagery of the user, and providing the second captured application imagery of the user to the application without displaying the captured application imagery to the user. A line connecting the first-mentioned desired position and the second desired position is substantially parallel to a plane of the display. A displacement between the first-mentioned desired position and the second desired position enables the application to use the first-mentioned captured application imagery and the second captured application imagery to extract three-dimensional information about the user.

In general, in another aspect, a mobile device comprises: a CPU; and a memory storing instructions for execution by the CPU, wherein execution of the instructions on the CPU implements a method of capturing imagery of a user of the mobile device, the method comprising: capturing positioning imagery of the user with a camera; processing the positioning imagery substantially in real time to generate abstracted positioning imagery of the user; displaying the abstracted positioning imagery of the user on a display facing the user, wherein the abstracted positioning imagery provides visual feedback for guiding the user to move to a desired position with respect to the camera, without the abstracted positioning imagery also providing sufficient visual information for the user to assess a visual quality of the positioning imagery; when the user is positioned in the desired position with respect to the camera, capturing application imagery of the user; and the captured application imagery of the user to an application without displaying the captured application imagery to the user.

In general, in a further aspect, a method of capturing imagery of a user comprises: capturing positioning imagery of the user with a camera; processing the positioning imagery substantially in real time to generate abstracted imagery of the user; displaying the abstracted imagery of the user on a display facing the user, wherein the abstracted imagery provides visual feedback for guiding the user to move to a desired position with respect to the display, without the abstracted imagery also providing sufficient visual information for the user to assess a visual quality of the captured positioning imagery; and when the user is positioned in the desired position with respect to the display, capturing application imagery of the user; and providing the captured application imagery of the user to an application without displaying the captured application imagery to the user.

Various embodiments include one or more of the following features. The abstracted imagery is based in part on a position of the camera with respect to the display. The position of the camera with respect to the display is inferred from analyzing the captured positioning imagery to determine at least one of a pose and a gaze of the user. The position of the camera with respect to the display is inferred from analyzing the captured positioning imagery when the user is directed to look at a displayed visual element on the display.

BRIEF DESCRIPTION OF THE FIGURES

FIG. 5A is a side view illustrating visual feedback for an optimal positioning of a user with respect to a display of a mobile device having a vertically and laterally offset camera.

FIG. 5B is a front view of the mobile device of FIG. 5A illustrating visual feedback for an optimal positioning of a user with respect to the display of the mobile device of FIG. 5A.

FIG. 5C is a front view of the user shown in FIG. 5A illustrating an optimal positioning of the mobile device of FIG. 5A.

DETAILED DESCRIPTION

Figure 1:
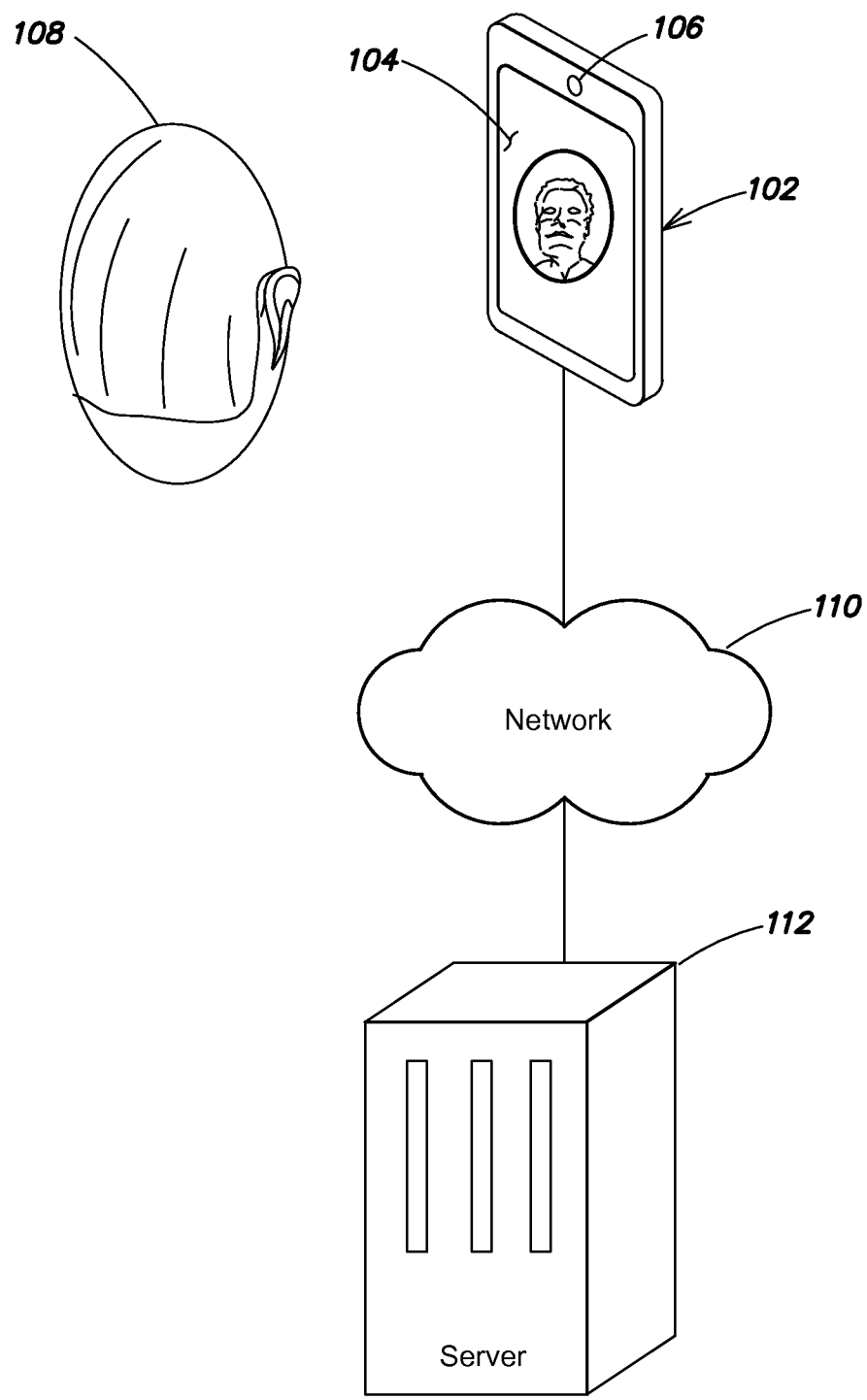
FIG. 1 is high level block diagram of a mobile device-based system for capturing imagery of a user while providing abstracted visual feedback to the user.
Figure 2:
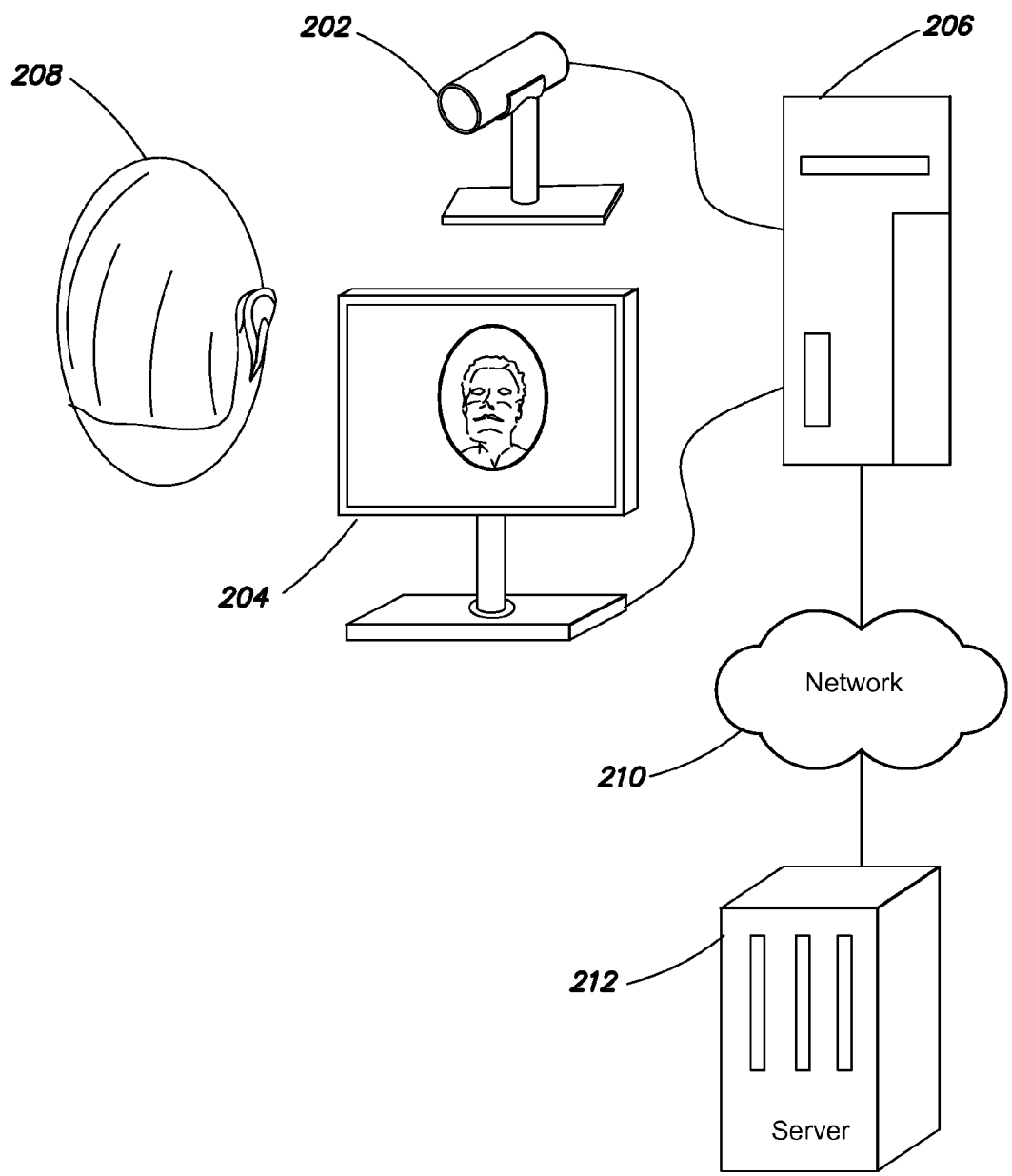
FIG. 2 is a high level block diagram of a computer-based system with separate camera and display for capturing imagery of a user while providing abstracted visual feedback to the user.

An increasing number of applications require the capture of a person's head or face without displaying the image to the user at all except under special circumstances. The image may be captured by a front-facing camera embedded in a mobile device carried by a user of the mobile device. FIG. 1 illustrates such a system, with device 102 having embedded display 104 and camera 106 facing user 108. The device may be in data communication via network 110 with remote sever 112. Alternatively, as illustrated in FIG. 2, the image may be captured by camera 202 mounted above or otherwise adjacent to external display monitor 204 of computer-based system 206, such as a laptop computer, personal computer, or workstation, with user 208 positioned within the field of view of the camera and near the display. The computer system may be connected via network 210 to remote server 212. In such applications, displaying a faithfully reproduced image of the user's head or face may be counterproductive, or unnecessarily consume computational resources. However, although the user's image is not displayed, an application may still need to capture imagery of the user's face that meets certain constraints. For example, in some applications, it may be important to capture an image of the user close up in order to ensure that their face is well illuminated by the screen. To achieve this, the user should be positioned closer to the screen, and thus also closer to an embedded camera, than is usual when capturing an image with a pleasing and undistorted perspective. As an example, an image captured from a distance of 30 cm at an angle of 30 degrees below the horizontal generates an unpleasant, even ugly portrait that a user would tend to avoid. Similarly, if an application needs to capture a good image of the user's nostrils, the camera viewpoint should be located at a much lower angle than is customarily used for pleasing facial imagery.

In general, for the applications discussed herein, the optimal relative position between a front-facing camera and the user's head or face should be determined by the application for which the imagery is intended rather than by aesthetic considerations. Such considerations include the resolution of the captured imagery, the facial features or background elements included within the field of view captured, and ambient lighting of the user's face. An application may further dictate an optimal position of the user's head with respect to a source of controlled illumination of the user's face. In the various embodiments described herein, the source of controlled illumination is a display screen, such as a monitor of a laptop or desktop computer, or a built-in display of a mobile device, such as smartphone, phablet, or tablet. For applications that involve illumination of the user's face by light emitted from the display, the optimal positioning of the user's head may be predominantly determined by the position relative to the display. Other sources of controlled illumination may include an external light source, such as an LED in data communication with the device or with the laptop, desktop computer, or remote system that is receiving the imagery from the front-facing camera.

An image of the user may be captured but not shown to the user nor to anyone they know when the captured image is to be used for a range of applications that involve analyzing the appearance or context of the user or some part of their visage to derive information about that user. Such information may include their identity, their similarity to a previously captured image, their nature as a real human being rather than a photograph, video, printed head, or synthetic image, or their health or emotion.

In such applications, even though the user may not see the captured imagery, it may be necessary to provide the user with sufficient visual feedback to enable the user to position his or her head or face, or some part thereof, in a way that is optimal for the application, but which may not correspond to normal positioning in front of the device's camera, nor one that produces aesthetically pleasing results.

While optimal positions for such applications may share some or all of the requirements for imagery that is shown to users, such as requiring that the user's face fall at least mainly within the field of view of the camera, they may differ in other respects. For example, while imagery captured for user consumption may not suffer if a small part of the head or face is cut off, the presence of that part may be essential to an analysis being conducted by an application. Indeed, in some circumstances, an application may fail to achieve its purpose or give a wrong result without the missing part. In another example, the presence of a strong light behind the user may throw the user's face into shadow or cause the camera to underexpose the face, which may be problematic for some applications. In each case, appropriate visual feedback is required to guide the user to shift into a position that avoids the circumstances adverse to the needs of the application.

Positions that may be optimal for applications that use a user-facing display as a source of illumination include placing the user's head in front of the display such that the plane of the display is capable of illuminating the parts of the face which are closest to the display and included in its field of view, such as the nose, mouth, eyes, or ears. This may be achieved by centering the display opposite the user's face, with the result that a camera positioned above the display is roughly positioned with its normal point to the user's hairline. In various embodiments, the plane of the display is oriented substantially parallel to the plane of user's face, i.e., to within about 10-20 degrees. In certain cases it may be desirable to position the display as close as is comfortable to the user's face so as to maximize the illumination capable of being cast onto the face by the display.

It may also be desirable to provide visual feedback to let the user know that the device is capturing an image of their head, face or of a part thereof. Otherwise, the user may be puzzled at what is happening, perhaps even becoming angry when learning that their image was captured without their knowledge. This reaction may occur even if the user was informed in writing that their image was to be captured since users often do not understand written disclosures fully. Visual feedback provides such a disclosure in a manner that is implicitly understood. The challenge is to provide the user with enough visual feedback to address the purposes discussed above, but without displaying a sufficiently faithful representation of the captured image such that any negative aesthetic quality risks distracting or upsetting the user.

Implementations of systems capturing users' facial images for facial verification or facial recognition normally display the image of the user to the user at the time of capture with a level of fidelity that renders them highly recognizable. Some systems used at border controls show the images in black and white, with a picture resolution and tonal rendering that would have sufficed as a personal photograph several decades ago. Some facial recognition systems used on personal computers or mobile smartphones display the image to the user in color in a portion of the screen. The image is shown with the fullest resolution possible for the image size, in full color and normal contrast. Such systems generally fail to overcome the challenge described above, namely that the nature of the displayed image risks disturbing the user and/or distracting the user from the task at hand.

We describe herein visual feedback methods and systems designed to provide users the guidance they need to position themselves correctly for applications that capture user imagery not primarily intended for the user's own consumption. Requirements for such feedback may include: a displayed image size large enough to provide easy and detailed visibility of the head or face position; sufficient image detail for the purposes of visual feedback; and sufficient abstraction, distortion, transformation, impressionism, or semiotic symbolism to render user assessment of its aesthetic quality, or of the attractiveness of the subject, difficult or impossible. Semiotic symbolism includes methods of signaling to the user the desired orientation of the device or desired changes in the orientation of the device using perceptual elements representing the desired device orientation or desired changes in the device orientation which do not include a representation of the user's face or head. Such perceptual elements may include visual graphic elements on the device screen, such as flashing arrows, chevrons, or animations, or the use of other visual indicators available on the device such as LED indicators or flashlights, audible signals using a device loudspeaker or ringer, or haptic feedback using the vibration or click generators of a device.

Figure 3:
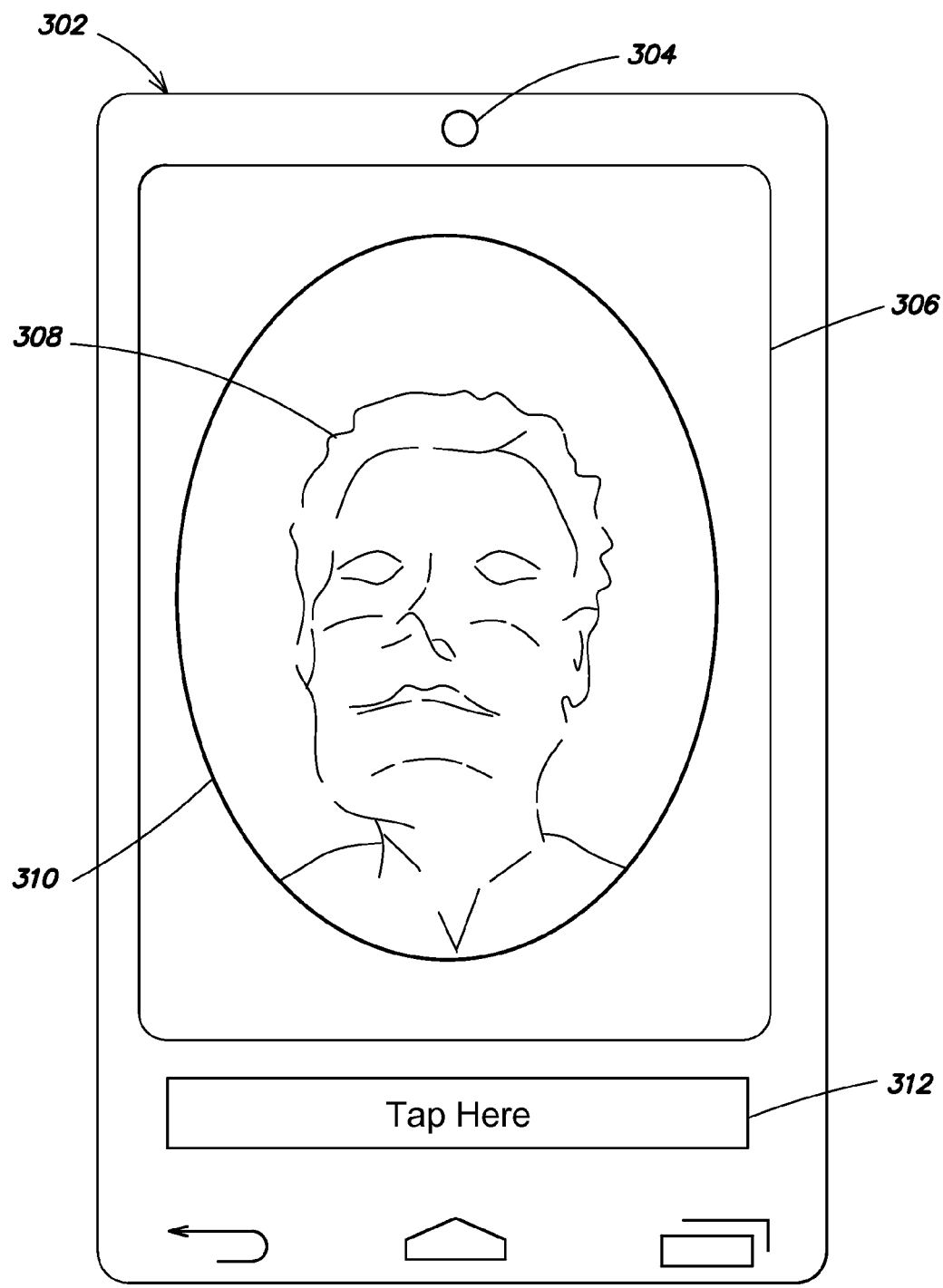
FIG. 3 is an illustration of a screen shot of a display of a camera-enabled device that is providing abstracted visual feedback to the user.

Generating the visual feedback may include image processing methods that generate abstracted imagery from the captured imagery of the user. One method involves processing the image of the user seen by the camera to extract edges, and displaying in real-time the laterally reversed (mirror image) edges as white or light-colored lines on a dark or black background or vice-versa, somewhat resembling a black-and-white, line drawing cartoon. This is illustrated in FIG. 3, in which mobile device 302 with built-in front-facing camera 304 and display touchscreen 306 is showing real-time or near real-time line drawing imagery 308 of the user's head.

Edge extraction involves identifying locations of substantial brightness changes over small spatial scales in the captured imagery of the user, with the assumption that the brightness contours in such locations correspond to edges of facial features or the outline of the user's head. The resulting displayed abstracted imagery resembles a printed cartoon when the edges are shown as black on a white background. The edges may be extracted by filtering the image with spatial filters of two different spatial distance bandwidths and subtracting one of the results from the other. A highly developed method for doing so is included in the well-known open source image processing program known as OpenCV and referred to as the Canny Edge Detector. The image processing algorithm parameters that affect the quality of the final image are chosen in accordance with the requirements outlined above, i.e., to produce an image which is sufficiently detailed to provide the necessary guidance to the user, but not so detailed as to produce an image which is unpleasantly detailed or contains so much rapid change as to be disturbing.

Various methods of generating abstracted imagery for providing visual feedback include one or more of the following aspects: applying a blur to the captured image, such as by using a large block pixilation; transforming the image into circles or bubbles with colors resembling the underlying image; exaggerating the contrast; using watercolor transformations; and using image processing features that are available in image adjustment software such as Instagram™ or Photoshop®. In each case, the displayed abstracted imagery is shown laterally reversed to form a mirror image of the user.

The parameters of the adopted image processing algorithm may be adjusted during capture according to prevailing light conditions in order to optimize the characteristics of the image presented to the user. This involves real time processing of the image captured by the camera to extract key image characteristics such as exposure, contrast, and focus, and to use the results of such processing to adjust the parameters applied to the image processing.

The processed image of the user is shown as a moving image approximating to video with a frame rate greater than 5 frames per second, so that the user quickly sees the effect of moving their head or the camera and the feedback process converges on the desired outcome. If the latency between movement and imagery feedback is too long, e.g., greater than one quarter second, the effect may be frustrating and could lead to an unstable set of movements without convergence on the desired outcome. For this reason it may be necessary to process the image on the user's device rather than on a remote system so as to achieve acceptable latencies. If the user has a high enough bandwidth network connection it may be possible to execute the image processing task remotely and transmit the processed moving image back over the network with acceptable latencies.

Once the user has reached the desired position with respect to the camera, the user is alerted and the imagery is captured. The alert may be provided using a visual or an audio cue. During the convergence process, the system may display a frame within which the user is to position their head. One visual cue includes changing the color or thickness of the frame when the user attains the right position. For example, the frame may consist of an oval, such as oval 310 in FIG. 3, displayed as a blue line three pixels thick when the user is not in the correct position and may turn into another color, such as green when the correct position is achieved. The user then causes camera 304 to capture an image, e.g., by pressing button 312.

Even though the imagery that is captured of the user is not primarily intended for consumption by the user, there may be special circumstances in which the image is in fact shown to the user. For example, when used with an online authentication system, such as that described in U.S. Pat. No. 9,075,975, it may be necessary to show the captured imagery to the user in cases of suspected fraud to demonstrate that it was indeed the user who was validly authenticated at the contested time, or alternatively to show that it was in fact someone else.

In addition to guiding the user to a preferred position relative the camera in which the user's face would positioned to ensure all key features are included in the image, the system may also guide the user to a preferred position relative to the display. Optimal positioning with respect to the display generally differs from optimal positioning with respect to the camera, since a camera is nearly always offset from the center of the display. In a mobile device, the embedded camera is located above and/or to the side of the display. The offset of a camera from the display may be especially large when the camera and display are separate units, as in the system having a separate camera and display illustrated in FIG. 2. The angular offset for a given display centroid-to-camera displacement increases the closer the user is to the display.

To help guide the user to an optimal position with respect to a display (as distinct from the camera), the user may be shown feedback imagery in which their head or face is in a different part of the screen from where it would be if the entire image captured by the camera were presented on the screen of the device in the normal fashion, i.e., with the field of view of the camera mapping directly onto the display area. This may be achieved by preprocessing the captured imagery before displaying it by cropping the image and performing a linear translation of the cropped portion on the screen, thereby guiding the user to position the camera such that the display is in the optimum position relative to their head or face. The linear translation may be vertical, horizontal, or at an angle, as discussed next. Thus a facial image may be shown as centered in that part of the screen used to display the abstract imagery even though it may have been captured well off the center of the camera's field of view.

Figure 4A:
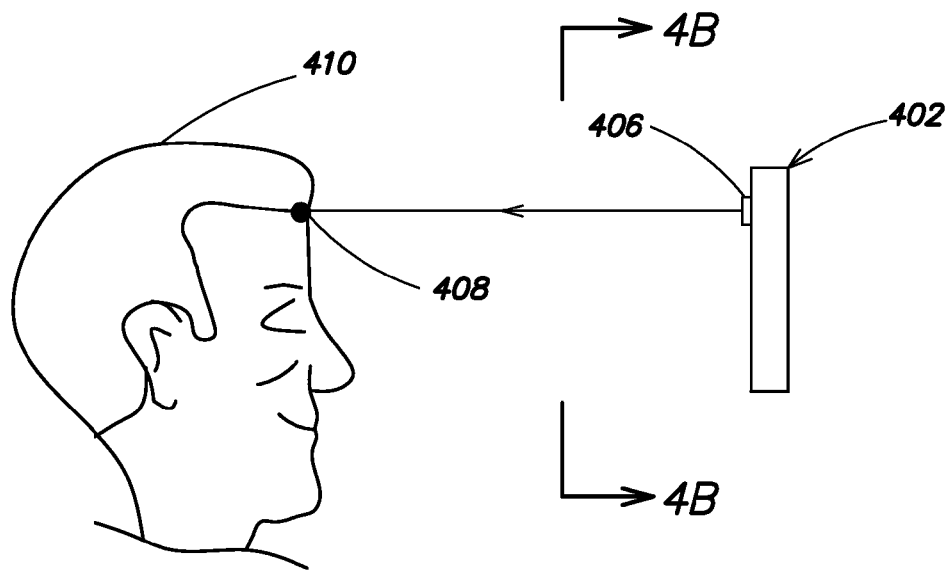
FIG. 4A is a side view illustrating visual feedback for an optimal positioning of a user with respect to a display of a mobile device having a vertically offset and laterally centered camera.
Figure 4B:
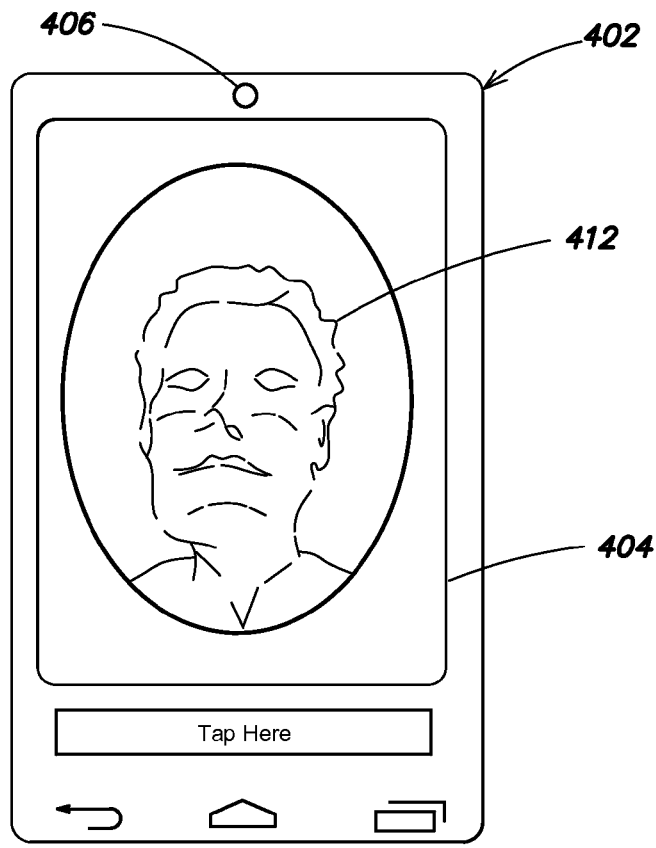
FIG. 4B is a front view of the mobile device of FIG. 4A illustrating visual feedback for optimal positioning of a user with respect to the display of the mobile device of FIG. 4A.

For applications that seek to maximize the ability of a display to illuminate a user's face for the purposes of authenticating the user, the optimum position occurs when as much of the display screen as possible is normal to lines that intersect features on the user's face, rather than their neck or ears. When such an optimal position is attained, the center of the face, i.e., somewhere between the nose and the mouth, lies directly opposite the centroid of the display. For hand-held devices, such as smartphones, in which the device is held in a portrait attitude with the camera above the display, this optimal position places the user's face below the center of the camera's field of view. The natural tendency of a user viewing the camera output (whether in abstracted form or as video) would be to reposition the device to bring their face into the center of the camera's field of view, when the user would no longer be optimally positioned with respect to the display. To guide the user to position the device in the desired position, the captured image that is shown to the user on the display is processed before being displayed to displace it upwards, with the user's face in the processed imagery becoming centered on the display only when the user has attained the desired position. For mobile devices with cameras centered above a display of about 4×2¼ inches, such visual feedback results in the normal axis through the center of the camera lens intersecting the user's face approximately at the user's hairline. FIGS. 4A and 4B illustrate such a configuration, with mobile device 402 having display 404 approximately centered opposite the user's face when the normal to camera 406 intersects hairline 408 of user 410. For devices with camera lenses that are laterally centered above the display, as shown in FIGS. 4A and 4B, the axis intersects the hairline along the middle of the face, i.e., on the mid-sagittal plane of the user's head, but displaced from the center of the head in a vertical direction, parallel to the transverse axis of the user's head. For devices with camera lenses above the display and displaced laterally with respect to the bisecting normal plane of the display, the optimal position corresponds to the camera lens axis intersecting the user's head at a point that is laterally displaced parallel to the sagittal axis by an amount equal to the lateral displacement of the camera lens from the bisecting normal plane of the display. This situation is illustrated in FIGS. 5A, 5B, and 5C, with device 502 having laterally displaced camera 504 optimally placed for positioning the head centrally opposed to device display 506 when the camera normal intersects the user's face at point 508 near the user's hairline that is laterally offset from mid-sagittal plane 510 of the user's head by an amount that corresponds approximately to offset 512 of camera 504 from mid-plane 514 of display 506.

In general, in order to cause the user to position the normal to the display screen centroid so that it intersects the center of the user's face, the abstracted imagery is translated before being displayed along the vector that connects the display screen centroid to the center of the camera lens. This translation achieves the desired result when the plane of the display screen and the plane of the user's face are approximately parallel to each other, as illustrated in FIGS. 4A and 4B, and 5A-C. The same translation also serves to cause the user to achieve the optimal position when the plane of the display screen is not parallel to the user's face, but inclined at an angle of up to about 30 degrees to it. In both cases, the optimal position occurs when as many lines normal to the display as possible intersect with facial features, rather than with the neck or ears.

Devices with front-facing cameras may be oriented in a landscape position when capturing imagery of the user. In this attitude, the camera is displaced laterally, i.e., along the sagittal axis, when the user's face is centered with respect to the display. For a device with a display of about 4×2.25 inches, centering the user's face in front of the display corresponds to directing the normal axis through the center of the camera lens through the user's ear. For devices with larger displays, such as smart phones, phablets, or tablets with displays in the range between about 5×2¾ inches to about 9×6 inches the displacement will be correspondingly greater, as dictated by the distance between the camera lens and the display centroid. Similar visual feedback may also be provided when the camera and the display are separate units, as illustrated in FIG. 2. In each of these situations, visual feedback guides the user to place the device in a position that is optimal with respect to the display. For visual feedback using abstracted user imagery, the abstracted imagery appears centered in that part of the screen used to display the abstract imagery when the optimal position is achieved, even though the user is not at the center of the camera's field of view, as shown in the position of abstracted user imagery 412 and 514 in FIGS. 4B and 5B respectively.

In order to determine how to adjust the feedback imagery to optimize the user's position with respect to the display, the system is given information specifying relative (or absolute) positions of the display and camera. If such information is not provided, the relative spacing may be determined by displaying test imagery and soliciting the user to identify certain features on the display, or by inferring it from the pose or gaze of the user. The pose or gaze of the user may be unprompted or it may be directed by asking the user to look at a particular location on the display, e.g., at a displayed static or moving visual element. The visual element may be controlled to cause changes in pose and/or gaze direction that are significantly affected by the magnitude and direction of the vector connecting the display centroid and the principal axis of the camera. Such techniques may be deployed both for mobile devices with built-in front-facing cameras and displays, as well as for computer-based systems with externally attached cameras and monitors.

Enlarging or diminishing the size of the feedback imagery may also serve to help the user position their head or face at an optimal distance from the display. This can be achieved by changing the effective focal length of the camera, or simply by processing that enlarges or shrinks the imagery displayed to the user. Optimal device-to-head distances depend, in part, on the size of the display, with smaller distances being generally desired for the smaller displays featured in mobile devices, and larger distances being favored when working with larger monitors connected to a laptop or workstation. It may also be desirable to control zoom to help maximize the resolution of captured user imagery while maintaining a comfortable viewing experience for users.

Certain applications may seek to obtain three-dimensional information from imagery of a user captured from a front-facing camera of a user's device. In other words, z-axis information is sought in addition to the information projected onto the x, y plane of a two dimensional image. Such depth information may be obtained by analyzing parallax effects from x and y direction movements, and changing occlusion, relative spacing of features, distortion, and perspective in a facial image resulting from changes in the relative position of the device's camera and the user's head in the x, y, as well as the z directions. Movements of the device of anywhere between about ¼ inch and 4 inches in a plane approximately parallel to the plane of the device display generate changes in viewpoint from which the desired depth information may be determined from parallax.

Movement sufficient to obtain such three-dimensional information may accompany a user's natural attempts to align themselves with respect to the camera and display using the feedback methods described above. However, if the user does not naturally generate enough parallax, or to obtain more accurate or different depth information, visual feedback may be used to guide the user to shift their position with respect to the device. Guidance may be implicit, such as by varying the displacement of displayed abstracted captured imagery relative to the camera's field of view, so that the user's attempts to center the abstracted imagery cause the user to perform the desired movements. Guidance may also be explicit, such as through displayed or spoken instructions, or through static or dynamic symbolic cues, such as arrows, chevrons, or animations that invite the user to move the device or their head in a prescribed direction.

While the user performs these movements, the absolute position of the device may be tracked using data from the device's built-in accelerometer. The accelerometer provides real-time position information, which provides the baseline for the viewpoint changes used to derive depth information in the imagery from parallax. By combining the imagery captured during the viewpoint changes with contemporaneous real-time position data from the accelerometer, more reliable and accurate three-dimensional information may be obtained, as compared to that obtained from analyzing the captured imagery on its own.

Abstracted visual feedback on a device display may also be used to elicit certain movements of the device and/or user's head for determining a level of consistency between imagery captured by a built-in device camera and the attitude and position data provided by the device's on-board accelerometer and gyroscope. Such consistency may be sought by an application seeking to authenticate the liveness and/or the identity of a device user. For example, left-right and up-down movements of the device may be elicited, with the changes in position tracked by an on-board accelerometer. The resulting changes in the captured user imagery may then be compared with the parallax expected to result from a changing viewpoint of a three-dimensional human head.

In another example, abstracted imagery or visual cues may be used to cause the user to change the device's attitude, such as by pivoting it about an axis approximately normal to the front of the user's face, i.e., about a coronal axis. To elicit such movement, the front-facing camera imagery may be abstracted and rotated about the coronal axis before being displayed to the user. The user may then instinctively attempt to keep their imagery upright by rotating the device, or the user may be explicitly invited to keep their image upright while varying angles of rotation are applied to the imagery before display. The resulting changes in the captured imagery may be compared to contemporaneous attitude data captured by a built-in gyroscope and a level of consistency between the expected and captured imagery determined.

Visual feedback may also elicit movements of the user towards or away from the display and/or camera (i.e., the z-direction) of a mobile device or system to which a camera and a display are connected as separate units. Suitable visual feedback includes preprocessing abstracted imagery of the user to enlarge or shrink the size of the head, and inviting the user to reposition themselves so that the displayed imagery is of a certain size. Thus, if the preprocessing shrinks the image, the user naturally compensates by moving closer to the camera, and vice-versa. To facilitate such adjustments, the abstracted imagery may be displayed within a box or oval outline, and the user invited to move closer or further until their outline just fills the outline. Alternatively, instead of altering the size of the displayed abstracted imagery, the size of the oval or box outline may be varied and the user invited to adjust their distance from the camera until their outline just fits within the outline. Both methods may be used in differing proportions to elicit the desired z-direction movements.

The viewpoint changes resulting from such movements towards or away from the camera cause changes in the captured imagery, with the relief in the user's head becoming more pronounced the closer they are to the camera. Such changes in the captured imagery may be compared with what would be expected from a three-dimensional object by analyzing the relationship between overall imagery scale changes, and changes in the internal arrangement and relative positions of facial features. In addition, real-time data captured from an on-board accelerometer may provide absolute z-direction displacement of the device, and provide further data with which to assess the consistency of the imagery with a three-dimensional human head.

Eliciting movements towards and away from the camera and the display may also be required to ensure that a front-facing camera captures a suitable field of view. Applications that require imagery of the user may require that the user be far enough away so that the entire face appears within the field of view. However, the application may also require facial imagery with as much resolution as possible, which would optimally place the user's face as close as possible to the camera, with the head just filling the field of view. Positioning the user's face optimally with respect to both the camera and the display for such applications corresponds to placing the center of the user's face as near to the centroid of the display as possible along the normal vector through the centroid of the display subject to the constraint that key features of the face, including the mouth, nose, and ears, fall within the field of view of the camera. When it is not possible to satisfy this constraint, the optimal position (and the corresponding visual feedback given to the user) is moved towards the camera axis by the minimum amount necessary to being the key features within the camera's field of view.

Visual feedback for positioning a user with respect to a front-facing camera and/or display may also include game-like elements. By playing the game, the user moves the device in a manner that positions it in accordance with the one or more positions desired by an application that requires imagery captured by the camera. One class of such visual feedback involves inviting the user to position a visual element at a particular target position on the screen. Such target positions may be static points on the display or regions defined by shading, outlines, or a feature in a displayed image. The visual element being positioned by the user may be a geometric shape, an icon, a simple animated character, or a virtual object, such as a virtual ball that is being rolled around on the screen by rocking the display to simulate an inclined surface upon which the ball rolls around under gravity. The target position may be static or dynamic. Static targets include a point or highlighted region at the screen center, or a region defined by a static graphic pattern or image shown on the display. Dynamic targets may move around the display in a continuous, smooth manner, or may jump from point to point on the screen. Such targets may be displayed as moving graphic elements, animated patterns, or moving imagery, including animation or video. In each case, the user is invited to position the visual element under their control at the displayed target position, and in so doing, moving the position and/or attitude of their device in the manner required by an application running on the device.

Embodiments of the described real-time user feedback for positioning a user with respect to a camera and a display may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device are also connected to the processor and memory system via the interconnection mechanism.

One or more output devices may be connected to the computer system. Example output devices include, but are not limited to, liquid crystal displays (LCD), plasma displays, reflective displays such as E Ink, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

Embodiments of the described real-time user feedback for positioning a user with respect to a camera and a display may be implemented as a computer program using a mobile device, such as a camera-enabled smartphone, tablet, or phablet. The mobile device may operate in standalone mode, or may be connected with a fixed or wireless connection to other computers, including one or more remote servers which may perform some of the computing steps described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, time-based and media data such as video data and audio data, still image data, or audio data, metadata, media annotations, and other data. The identity of the computer system may not be readily available to users and/or the client devices in data communication with the system. The system may be embodied in one or more servers located at one or more remote locations. The functions performed by the computer system or of a remote server may be implemented as a cloud service.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Database information, facial image and voice information, and other online user identification information may be stored on and input from magnetic, optical, or solid state drives, which may include an array of local or network attached disks.

A system such as described herein may be implemented in software, hardware or firmware, or a combination of the three. The various elements of the system, either individually or in combination may be implemented as one or more computer program products in which computer program instructions are stored on a computer readable medium for execution by a computer, or transferred to a computer system via a connected local area or wide area network. Computer program instructions may also be sent via communication media, such as carrier signals and the like. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of capturing imagery of a user, the method comprising:
    capturing positioning imagery of the user with a camera;
    processing the positioning imagery substantially in real time to generate abstracted positioning imagery of the user wherein the abstracted positioning imagery represents:
        at least a partial outline of a body part of the user; and
        a plurality of anatomical features of the body part of the user inside and distinct from the at least partial outline;
    displaying the abstracted positioning imagery of the user on a display facing the user, wherein the abstracted positioning imagery provides visual feedback for guiding the user to move to a desired position with respect to the camera, without the abstracted positioning imagery also providing sufficient visual information for the user to assess an aesthetic quality of the user's appearance in the positioning imagery;
    when the user is positioned in the desired position with respect to the camera, capturing application imagery of the user; and
    providing the captured application imagery of the user to an application without displaying the captured application imagery to the user.

2. The method of claim 1, wherein the abstracted positioning imagery further provides visual feedback for guiding the user to move to a desired position with respect to the display, and wherein the application imagery of the user is captured when the user is positioned in the desired position with respect to the display.

3. The method of claim 1, wherein the display is capable of illuminating parts of the user that are closest to the display and included within a field of view of the camera when the user is in the desired position with respect to the camera.

4. The method of claim 1, wherein a normal to a centroid of the display intersects a head of the user at a point less than approximately two inches from a tip of a nose of the user when the user is in the desired position with respect to the camera.

5. The method of claim 1, wherein the user is located at a closest comfortable distance from the display when the user is in the desired position with respect to the camera.

6. The method of claim 1, wherein the camera is angled upwards towards the user when the user is in the desired position with respect to the camera.

7. The method of claim 1, wherein displaying the abstracted imagery includes displacing imagery of the user to appear centered in the display when the user is off-center in the captured positioning imagery.

8. The method of claim 1, wherein the captured imagery includes video imagery.

9. The method of claim 1, wherein the application imagery includes video imagery.

10. The method of claim 1, wherein the application imagery includes a still image.

11. The method of claim 1, wherein the display is used to illuminate the user during capture of the application imagery of the user.

12. The method of claim 1, wherein the camera and the display are connected to a local computer-based system having a network connection, and further comprising:
    at the local computer-based system, receiving data via the network connection for controlling the display; and
    during capture of the application imagery, using the local computer-based system to control the display using the data received at the computer-based system via the network connection.

13. The method of claim 12, wherein the received data cause the display to act as a source of controlled illumination of the user.

14. The method of claim 1, wherein the abstracted positioning imagery includes lines representing substantial changes in brightness at small spatial scales in captured positioning imagery of the user.

15. The method of claim 1, wherein the abstracted positioning imagery includes blurred imagery of the user.

16. The method of claim 1, wherein the abstracted positioning imagery includes circular features with colors based on colors of the captured positioning imagery.

17. The method of claim 1, wherein the user is alerted when the application imagery is captured.

18. The method of claim 1, further comprising:
    after capturing application imagery of the user, displaying second abstracted positioning imagery of the user on the display facing the user, wherein the second abstracted positioning imagery provides visual feedback for guiding the user to move to a second desired position with respect to the camera;
    when the user is positioned in the second desired position with respect to the camera, capturing second application imagery of the user; and
    providing the second captured application imagery of the user to the application without displaying the captured application imagery to the user.

19. The method of claim 18, wherein a line connecting the first-mentioned desired position and the second desired position is substantially parallel to a plane of the display.

20. The method of claim 18, wherein a displacement between the first-mentioned desired position and the second desired position enables the application to use the first-mentioned captured application imagery and the second captured application imagery to extract three-dimensional information about the user.

21. A mobile device comprising:
a CPU; and
a memory storing instructions for execution by the CPU, wherein execution of the instructions on the CPU implements a method of capturing imagery of a user of the mobile device, the method comprising:
capturing positioning imagery of the user with a camera;
processing the positioning imagery substantially in real time to generate abstracted positioning imagery of the user wherein the abstracted positioning imagery represents:
at least a partial outline of a body part of the user; and
a plurality of anatomical features of the body part of the user inside and distinct from the at least partial outline;
displaying the abstracted positioning imagery of the user on a display facing the user, wherein the abstracted positioning imagery provides visual feedback for guiding the user to move to a desired position with respect to the camera, without the abstracted positioning imagery also providing sufficient visual information for the user to assess an aesthetic quality of the user's appearance in the positioning imagery;
when the user is positioned in the desired position with respect to the camera, capturing application imagery of the user; and
providing the captured application imagery of the user to an application without displaying the captured application imagery to the user.

22. A method of capturing imagery of a user, the method comprising:
capturing positioning imagery of the user with a camera;
processing the positioning imagery substantially in real time to generate abstracted imagery of the user;
displaying the abstracted imagery of the user on a display facing the user, wherein the abstracted imagery provides visual feedback for guiding the user to move to a desired position with respect to the display, without the abstracted imagery also providing sufficient visual information for the user to assess an aesthetic quality of the user's appearance in the captured positioning imagery; and
when the user is positioned in the desired position with respect to the display, capturing application imagery of the user; and
providing the captured application imagery of the user to an application without displaying the captured application imagery to the user.

23. The method of claim 22, wherein the abstracted imagery is based in part on a position of the camera with respect to the display.

24. The method of claim 23, wherein the position of the camera with respect to the display is inferred from analyzing the captured positioning imagery to determine at least one of a pose and a gaze of the user.

25. The method of claim 23, wherein the position of the camera with respect to the display is inferred from analyzing the captured positioning imagery when the user is directed to look at a displayed visual element on the display.

* * * * *